United States Patent [19]

Greggain

[11] Patent Number: 5,502,662
[45] Date of Patent: * Mar. 26, 1996

[54] METHOD AND APPARATUS FOR QUADRATIC INTERPOLATION

[75] Inventor: Lance Greggain, Woodbridge, Canada

[73] Assignee: Genesis Microchip Inc., Markham, Canada

[*] Notice: The portion of the term of this patent subsequent to Jan. 3, 2012, has been disclaimed.

[21] Appl. No.: 329,163

[22] Filed: Oct. 26, 1994

Related U.S. Application Data

[63] Continuation of Ser. No. 172,065, Dec. 23, 1993, Pat. No. 5,379,241.

[51] Int. Cl.⁶ .................................................. G06F 7/38
[52] U.S. Cl. ................................................................ 364/723
[58] Field of Search ................................. 364/723, 718, 364/724.01

[56] References Cited

U.S. PATENT DOCUMENTS

| | | | |
|---|---|---|---|
| 3,789,203 | 1/1974 | Catherall et al. | 364/723 |
| 4,694,414 | 9/1987 | Christopher | 364/723 |
| 4,763,293 | 8/1988 | Takei et al. | 364/723 |
| 5,068,816 | 11/1991 | Noetzel | 364/723 |
| 5,257,355 | 10/1993 | Akamatsu | 364/723 |

OTHER PUBLICATIONS

R. W. Schafer and L. R. Rabiner, "A Digital Signal Processing Approach to Interpolation", Proceedings of the IEEE, vol. 61, Jun. 1973, pp. 692–702.

*Primary Examiner*—Tan V. Mai
*Attorney, Agent, or Firm*—Staas & Halsey

[57] ABSTRACT

A method of signal sample interpolation utilizing a second order curve utilizing a linear interpolator to select a midpoint between respective input samples, eliminating phase error and spatial variation, utilizing the interpolated points as reference points for a quadratic interpolation wherein the space between the reference points is one half the distance between respective signal sample points, and thirdly combining the operations of linear interpolation and quadratic interpolation for simultaneous execution. More particularly, the quadratic interpolation is reformed based on the output of the linear interpolation.

3 Claims, 3 Drawing Sheets

METHOD AND APPARATUS FOR QUADRATIC INTERPOLATION

This application is a continuation of application Ser. No. 08/172,065, filed Dec. 23, 1993, now U.S. Pat. No. 5,379,241 filed Jan. 24, 1995.

FIELD OF THE INVENTION

The present invention relates in general to interpolations and more particularly to a quadratic interpolator for generating a series of output samples forming an approximate curve between successive input signal samples.

BACKGROUND OF THE INVENTION

Mathematical interpolation has been used for many years in many fields of science for approximating curves between known signal sample points. The subject of interpolation is treated in many text-books, such as Robert L. Ketter and Sherwood P. Prawel Jr., entitled "Modern Methods of Engineering Computation", McGraw Hill 1969. Many advanced methods of interpolation have been used in digital signal processing for many years, as described in Rabiner L. R. and Schafer "Digital Processing of Speech Signals", Prentice Hall, 1978, as well as George Wolberg entitled "Digital Image Warping", IEEE Computer Society Press, 1988.

According to the known prior art interpolation techniques utilized in digital signal processing, interpolation has been restricted to either linear interpolation or cubic interpolation. Quadratic interpolation has not been hitherto implemented in digital signal processing systems because prior art quadratic interpolators are known to be space variant and to introduce phase distortion in the output signal. One paper that is often cited as being the definitive paper on this subject is by R. W. Schafer and L. R. Rabiner and is entitled "A Digital Signal Processing Approach to Interpolation", Proceedings of the IEEE, volume 61, June 1973.

Linear interpolation is a commonly used form of interpolation in which a straight line $$y=ax+b \qquad \text{(equation 1)}$$

is passed through two known points (e.g. $y(0)$ and $y(1)$). Points that lay between $x=0$ and $x=1$ are determined by evaluating $$y=y(0)+(y(1)-y(0))x \text{ for } 0 \leq x \leq 1. \qquad \text{(equation 2)}$$

Linear interpolation has been preferred over cubic interpolation in the field of digital signal processing since, even though the frequency response of linear interpolation is inferior to that of cubic interpolation. Cubic interpolation systems require a great deal more calculation and storage hardware to implement than linear interpolation.

Quadratic interpolation as described in the above-discussed reference of Ketter and Prawel, and many others, is achieved by fitting a quadratic equation of the form $$y=ax^2+bx+c \qquad \text{(equation 3)}$$

to three known points (e.g. $y(-1)$, $y(0)$ and $y(1)$). The resulting interpolation equation is:

$$y=((y(-1)-2y(0)+y(1))/2)x^2+ ((y(1)-y(-1))/2)x+y(0) \quad -1 \leq x \leq +1 \qquad \text{(equation 4)}$$

The main disadvantage of using quadratic interpolation in digital signal processing and other applications is the distortion which ocurrs at the transition from one set of sample points to another. As discussed in greater detail below with reference to the Figures, incorrect selection of a reference sample point can result in significant curve discontinuities (i.e. distortion) in the output interpolated curve approximation between the points.

SUMMARY OF THE INVENTION

According to the present invention a method and apparatus are provided for implementing quadratic interpolation with low phase distortion and an absence of discontinuities caused by inappropriate selection of reference points. According to the invention, reference points are determined for implementing the interpolation in such a manner as to eliminate phase distortion and spatial variation. The determination of these reference points is accomplished using a linear interpolator for selecting the mid-point between input samples. Next, the interpolated points are used as reference points for a quadratic interpolation where the space between the reference points is one half the distance between respective known sample points. Thus, the quadratic interpolation implemented according to the present invention may be expressed by the following formula:

$$y(x)=((y(-0.5)-2y(0)+y(0.5))/0.5)x^2+ (y(0.5)-y(-0.5))x+y(0)- \quad 0.5 \leq x \leq +0.5 \qquad \text{(equation 5)}$$

According to the preferred embodiment, the operations of linear interpolation and quadratic interpolation discussed above, are performed simultaneously by reforming the quadratic interpolation equation based on the output of the linear interpolation equation. The resulting quadratic formula is as follows:

$$y=(y(-1)-2y(0)+y(1))x^2+((y(1)-y(-1))/2)x+y(0)-0.5 \leq x \leq +0.5$$

(equation 6)

The output signal sample values of y are interpolated in a plus or minus 0.5 range about the centre sample, assuming an arbitrary sample spacing of 1.0. However, the principles of the present invention may be extended for sample spacing other than 1, by simply selecting reference points which are one half of the given sample spacing.

BRIEF DESCRIPTION OF THE DRAWINGS

A description of the prior art and of the preferred embodiment of the present invention is provided hereinbelow with reference to the following drawings in which.

DETAILED DESCRIPTION OF THE PRIOR ART AND OF THE PREFERRED EMBODIMENT

Figure 1B:
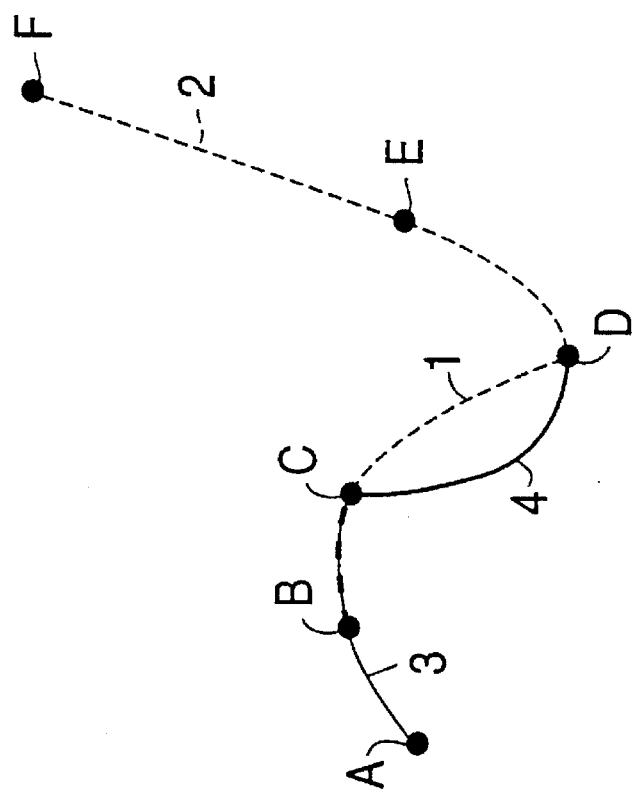
FIG. 1B shows two possible approximation curves obtained utilizing quadratic interpolation according to the prior art.
Figure 1A:
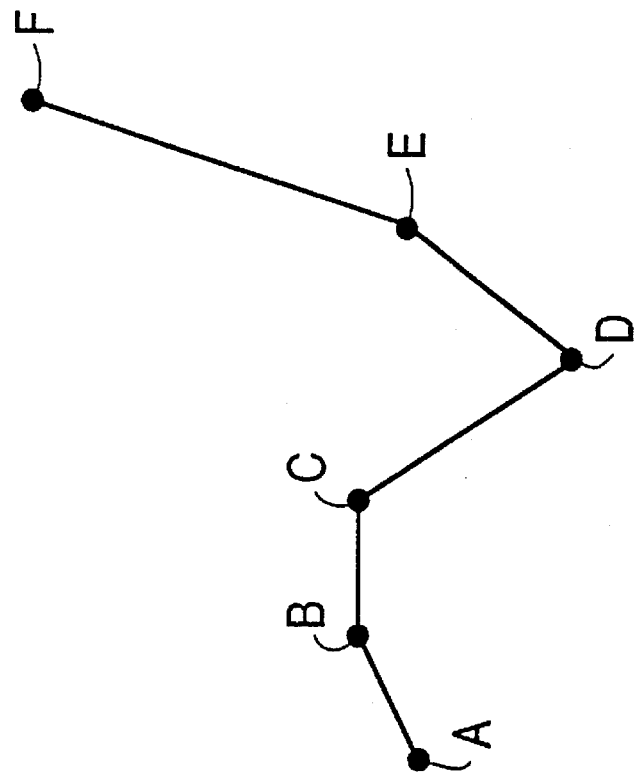
FIG. 1A is an approximated curve between a plurality of known signal sample points generated by linear interpolation according to the prior art.

Turning to FIG. 1A, a curve is shown which is an approximation utilizing known sample points A, B, C, D, E, and F utilizing linear interpolation. As will be noted, since linear interpolation is being utilized, the curves between respective ones of the points A, B, C, etc. are linear. This results in an extremely rough approximation of the actual curve between the known signal sample points, and also results in the generation of significant harmonic distortion due to the sharp edges of the approximated curve.

By way of contrast, the curves 1 and 2 illustrated in FIG. 1B, which have been generated by utilizing quadratic interpolation, are much smoother but are otherwise close in approximation to the curve generated by linear interpolation (FIG. 1A). However, as discussed above, the main disadvantage of utilizing quadratic interpolation in digital signal processing results from spatial variance and phase distortion during the transition from one set of samples to another. While lines 1 and 2 in FIG. 1B represent a possible approximation curve generated by quadratic interpolation and which is also generated by the same quadratic interpolation but is quite similar to the one described by the linear interpolation of FIG. 1A, the curve represented by lines 3 and 4 is radically different. The difference between obtaining lines 1 and 2 or lines 3 and 4 using the same quadratic interpolation is a matter of which three pixels are used as the reference points for the interpolation (curve 1 is uses points B, C, D and curve 2 used points D, E, F whereas curve 3 uses points A, B, C and curve 4 uses points C, D, E). Lines 3 and 4 show a marked discontinuity that is extremely undesirable in digital signal processing and other scientific applications.

Figure 2A:
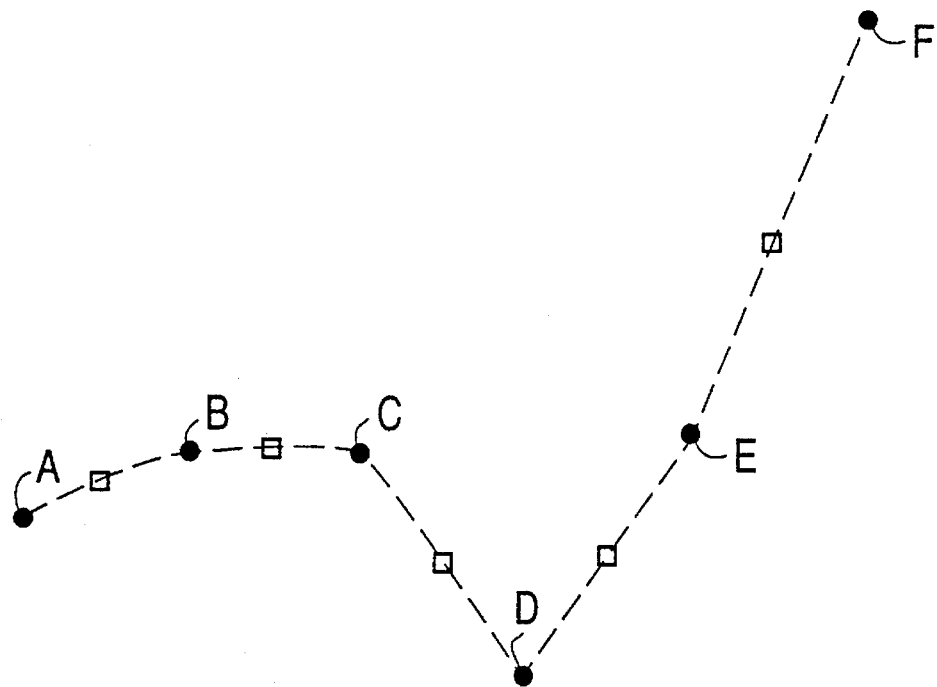
FIG. 2A shows the determination of reference points selected at the mid-point between input samples using linear interpolation, according to one aspect of the present invention.
Figure 2B:
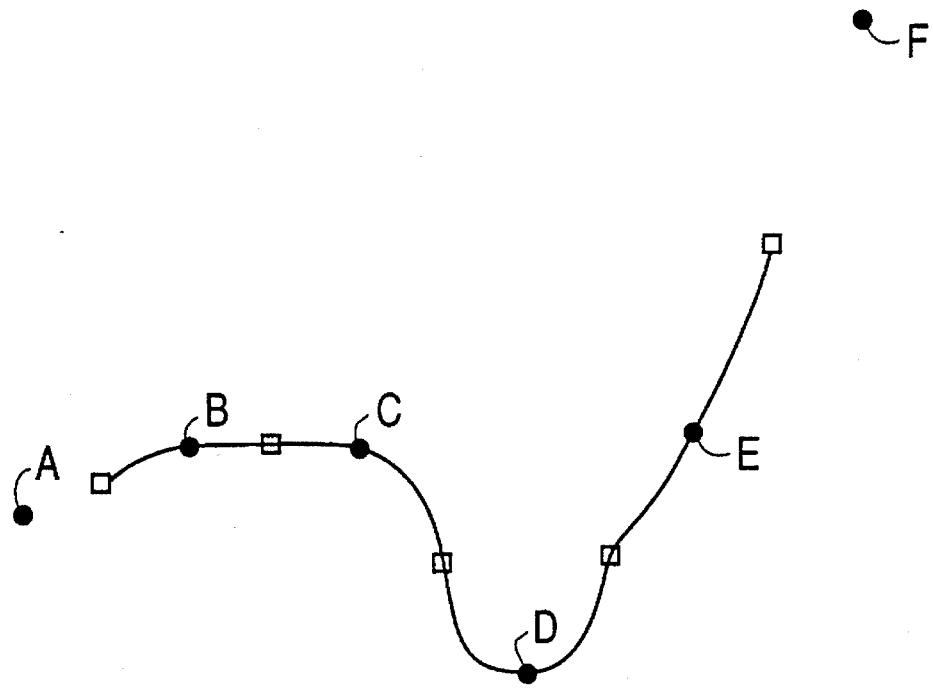
FIG. 2B shows a curve constructed using quadratic interpolation using the mid-points determined by linear interpolation in FIG. 2A, according to another aspect of the present invention.

Turning now to FIGS. 2A and 2B, according to the method of the present invention, rather than using the known signal sample points A, B, C, D, E and F as reference points, linear interpolation is used in the present invention to determine respective mid-points between the input samples, as shown in FIG. 2A.

Next, the interpolated reference points are utilized in a quadratic formula where the space between the reference points is 0.5 as opposed to 1.0, yielding the curve of FIG. 2B.

Figure 3:
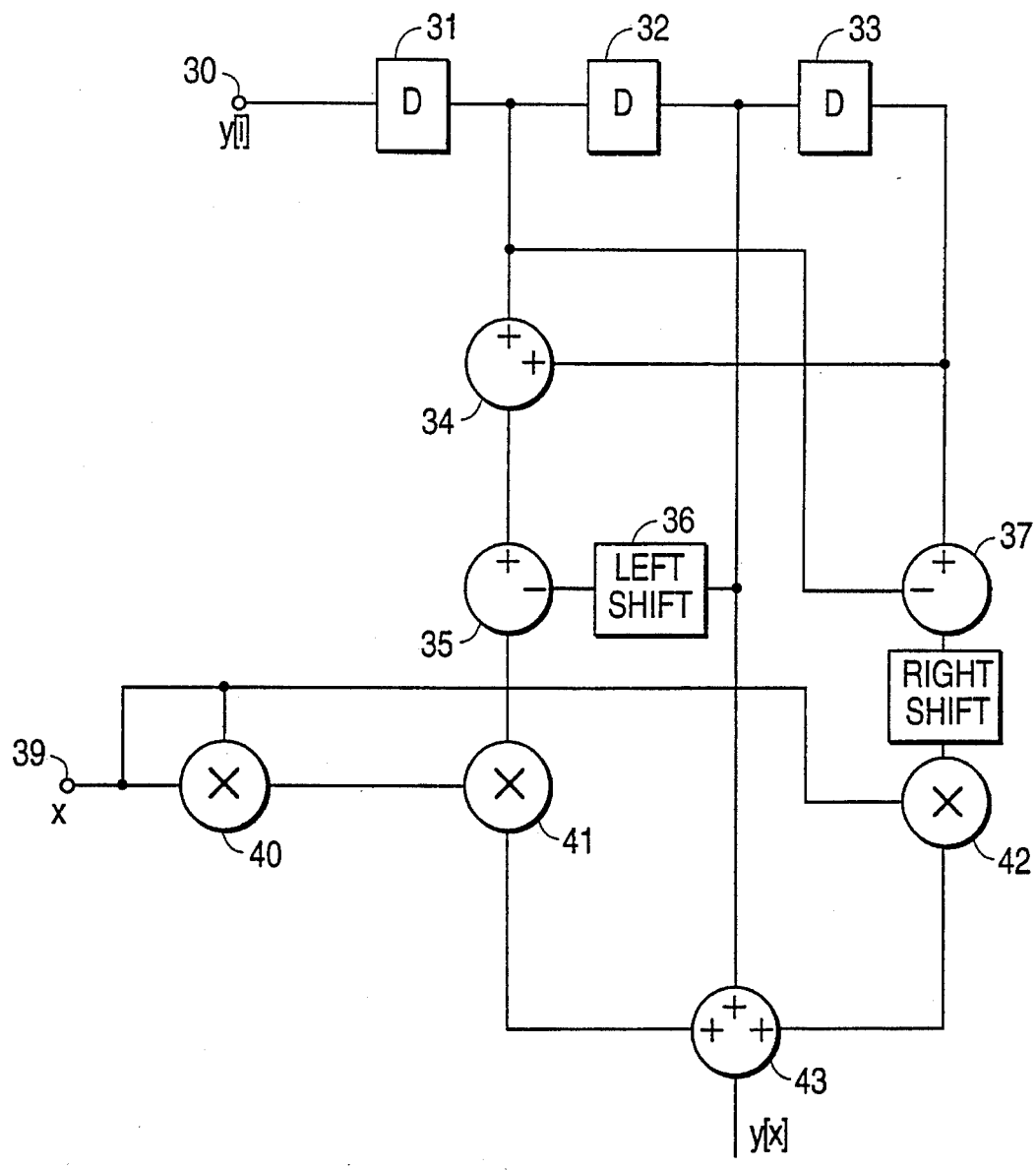
FIG. 3 is a block circuit diagram of a quadratic interpolator according to the preferred embodiment.

Turning now to the circuit diagram of FIG. 3, a preferred implementation of the quadratic interpolator of the present invention is illustrated for an input sample data stream.

The three data points $y(-1), y(0)$ and $y(1)$ are received via an input 30 and stored in respective ones of series-connected registers 31, 32 and 33.

An adder 34 adds the signal samples $y(-1)$ and $y(1)$ and applies the resulting signal to an non-inverting input of subtractor 35. The second reference sample point $y(0)$ is shifted one bit to the left in shift register 36, which has the effect of multiplying the value $y(0)$ by 2. The output of shift register 36 is applied to the inverting input of subtractor 35. Thus, the output of subtractor 35 corresponds to the value "a" from equation 6, namely:

$$a = y(-1) + y(1) - 2y(0).$$

Subtractor 37 takes the difference between $y(-1)$ and $y(1)$ and the output thereof is right-shifted by one bit in shift register 38, yielding the value "b" from equation 6, namely:

$$b = (y(1) - y(-1))/2.$$

The value of x is received on input 39 and is applied to both inputs of a multiplier 40 which therefore squares the value of x. Multipliers 41 and 42 perform the operations "$ax^2$" and "$bx$", respectively.

The three input adder 43 sums the outputs of multipliers 41 and 42 with $y(0)$ received from storage register 32, and in response produces the output interpolated value $y(x)$.

Although the preferred embodiment of the present invention has been defined in terms of a digital circuit shown in FIG. 3, other circuit configurations are possible for achieving the same result.

Furthermore, the method of quadratic interpolation according to the present invention may be implemented in software. The C source code listing for one such possible software implementation of the present invention is appended hereto as appendix A.

All such modifications and alternative embodiments of the present invention are believed to be within the sphere and scope of this invention as defined by the claims appended hereto.

APPENDIX –

```
/*-------------------------------------------------------------------------

Module  : Three point interpolation

Version : 1.0

Author  : James Goel

Copyright(c) 1993 Genesis Microchip Inc.
               2900 John St.
               Markham, Ontario
               L3R 5G3
               (416) 470-2742

Module :

vHorizontal 3 Point Zoom

Description :

This routine expands an image in the horizontal direction using a
       special 3 point zoom interpolation.

Inputs:

Source Line -- Structure containing the source line to be horizontally
                      expanded.
    Outputs:

Target Line -- This buffer contains the resized horizontal line.

-------------------------------------------------------------------------*/
void
vHorzZoom( VIDEO_LINE   *psSrcLine,
           FRAC_LINE    *psTarLine){ float     fTincAccum;     /* Tinc accumulator */
    float     fTinc;          /* Tinc value */
    float     fBoundary;      /* Boundary condition */
    float     X;              /* Distance from boundary pixel */

/*
       UpSampled equation:

P[x] = sAlpha*x^2 + sBeta*x + sCappa

*/
    FLOAT_PIX   sAlpha;
    FLOAT_PIX   sBeta;
    FLOAT_PIX   sCappa;

int       cbUpCount;      /* Up sampled pixel counter */
    int       cbSrcCount;     /* Source counter */
    int       iLeft;          /* Leftmost pixel */
    int       iMiddle;        /* Middle pixel */
    int       iRight;         /* Rightmost pixel */

/* Initialize variables */
    cbSrcCount = 0;
    cbUpCount  = 0;
```

```
fTincAccum  = 0;
fTinc       = (float) iHorzTinc / (float) FLOAT_PRECISION;
fBoundary   = (float) 0.5;

/* Initialize the first three pixel indexes */
iLeft = 1;
iMiddle = 0;
iRight = 1;

/* Calculate the first sAlpha,sBeta,sCappa */
vCalcABC (psSrcLine, iLeft, iMiddle, iRight, &sAlpha, &sBeta, &sCappa);

/* Move the source pointers to the next three pixels */
iLeft = 0;
iMiddle = 1;
iRight = 2;

do
{
    /* Calculate distance to the next centre pixel */
    X = fTincAccum - cbSrcCount;

/* IF the accumulate Tinc has crossed the boundary, THEN */
    if (fTincAccum >= fBoundary)
    {

/* IF the leftmost pixel has not reached the end of the source
           line, THEN */ if (iLeft < (cbSrcPix-1)-1)
            vCalcABC ( psSrcLine,iLeft++,iMiddle++,iRight++,
                       &sAlpha,&sBeta,&sCappa);
        else
            vCalcABC ( psSrcLine,iLeft, iMiddle, iLeft,
                       &sAlpha,&sBeta,&sCappa);
        fBoundary++;
        cbSrcCount++;
        X = fTincAccum - cbSrcCount;
    } psTarLine->plRedpix[cbUpCount] = (long) (sAlpha.fRedpix*X*X +
                                             sBeta.fRedpix*X +
                                             sCappa.fRedpix);

psTarLine->plGrnpix[cbUpCount] = (long) (sAlpha.fGrnpix*X*X +
                                             sBeta.fGrnpix*X +
                                             sCappa.fGrnpix);

psTarLine->plBlupix[cbUpCount] = (long) (sAlpha.fBlupix*X*X +
                                             sBeta.fBlupix*X +
                                             sCappa.fBlupix);

cbUpCount++;
    fTincAccum += fTinc;

} while (cbUpCount < cbTarPix);
``` vCalculate Alpha, Beta and Cappa for 3 point interpolation

Description :

This routine calculates Alpha, Beta and Cappa for a single horizontal line.

Inputs:

Source Line -- Structure containing the source line to be horizontally expanded.

int iLeft, iMiddle, iRight
        -- Array indices that control which horizontal pixel is processed.

Outputs:

sAlpha    -- Alpha value for equation (contains Red, Green and Blue)
    sBeta     -- Beta value for equation (contains Red, Green and Blue)
    sCappa    -- Cappa value for equation (contains Red, Green and Blue)

```
---------------------------------------------------------------------------*/
void calcABC (VIDEO_LINE   *psSrcLine,
              int          iLeft,
              int          iMiddle,
              int          iRight,
              FLOAT_PIX    *sAlpha,
              FLOAT_PIX    *sBeta,
              FLOAT_PIX    *sCappa){

/* Alpha = P[-1] + P[1] - 2*P[0] */ sAlpha->fRedpix = psSrcLine->pbRedpix[iLeft] +
                    psSrcLine->pbRedpix[iRight] -
                    2*psSrcLine->pbRedpix[iMiddle];

sAlpha->fGrnpix = psSrcLine->pbGrnpix[iLeft] +
                    psSrcLine->pbGrnpix[iRight] -
                    2*psSrcLine->pbGrnpix[iMiddle];

sAlpha->fBlupix = psSrcLine->pbBlupix[iLeft] +
                    psSrcLine->pbBlupix[iRight] -
                    2*psSrcLine->pbBlupix[iMiddle];

/* Beta = (P[1] - P[-1])/2 */ sBeta->fRedpix = (psSrcLine->pbRedpix[iRight] -
                    psSrcLine->pbRedpix[iLeft] )/2;

sBeta->fGrnpix = (psSrcLine->pbGrnpix[iRight] -
                    psSrcLine->pbGrnpix[iLeft] )/2;

sBeta->fBlupix = (psSrcLine->pbBlupix[iRight] -
                    psSrcLine->pbBlupix[iLeft] )/2;

/* Cappa = P[0] */ sCappa->fRedpix = psSrcLine->pbRedpix[iMiddle];
  sCappa->fGrnpix = psSrcLine->pbGrnpix[iMiddle];
  sCappa->fBlupix = psSrcLine->pbBlupix[iMiddle];
```

```
/*------------------------------------------------------------------

Module :

vVertical Zoom

Description :

This routine expands an image in the vertical direction.

Inputs:

Source Line -- Structure containing the source line to be vertically
                       expanded.
    Outputs:

Target Line -- This buffer contains the resized vertical line.

------------------------------------------------------------------*/ void VertZoom(){ float       fTincAccum;     /* Tinc accumulator */
    float       fTinc;          /* Tinc value */
    float       fBoundary;      /* Boundary condition */
    float       X;              /* Distance from boundary line   */

/*
        UpSampled equation:

P[x] = sAlpha*x^2 + sBeta*x + sCappa

*/
    FLOAT_LINE  sAlpha;
    FLOAT_LINE  sBeta;
    FLOAT_LINE  sCappa;

int         cbUpCount;      /* Up sampled pixel counter */
    int         cbSrcCount;     /* Source counter */
    int         cCount;         /* Pixel counter */

VIDEO_LINE  sLeft;          /* Leftmost line */
    VIDEO_LINE  sMiddle;        /* Middlemost line */
    VIDEO_LINE  sRight;         /* Rightmost line */

BYTE *pbRedTemp;
    BYTE *pbGrnTemp;
    BYTE *pbBluTemp;

FRAC_LINE   sTarLine;       /* Output target line */

/* Initialize variables */
    cbSrcCount  = 0;
    cbUpCount   = 0;
    fTincAccum  = 0;
    fTinc       = (float) iVertTinc / (float) FLOAT_PRECISION;
    fBoundary   = (float) 0.5;

/* Allocate memory space for required lines */
```

```
vAllocSrcLine( &sMiddle );
vAllocSrcLine( &sRight  );
vAllocTarLine( &sTarLine );

vAllocFloatLine ( &sAlpha );
vAllocFloatLine ( &sBeta  );
vAllocFloatLine ( &sCappa );

/* Read in first three lines */
vReadRGB ( &sMiddle );
vReadRGB ( &sRight );

for (cCount=0; cCount < cbSrcPix; cCount++)
{
   sLeft.pbRedpix[cCount]=sRight.pbRedpix[cCount];
   sLeft.pbGrnpix[cCount]=sRight.pbGrnpix[cCount];
   sLeft.pbBlupix[cCount]=sRight.pbBlupix[cCount];
}

/* Calculate the first sAlpha,sBeta,sCappa */
vCalcLineABC ( &sLeft, &sMiddle, &sRight,
               &sAlpha, &sBeta, &sCappa);

do
{
   /* Calculate distance to the next centre line */
   X = fTincAccum - cbSrcCount;

/* IF the accumulate Tinc has crossed the boundary, THEN */
   if (fTincAccum >= fBoundary)
   {

/* IF the leftmost line has not reached the end of the source
         line, THEN */ if ((cbSrcCount < (cbSrcLine-1)-1))
      {
         vAdvance ( &sLeft, &sMiddle, &sRight );
         vCalcLineABC (&sLeft,&sMiddle,&sRight,&sAlpha,&sBeta,&sCappa);
      }
      else
      {
         /* Make a temporary copy of the Left pointer */
         pbRedTemp = sLeft.pbRedpix;
         pbGrnTemp = sLeft.pbGrnpix;
         pbBluTemp = sLeft.pbBlupix;

/* Copy the Middle line to the Left line */
         sLeft.pbRedpix = sMiddle.pbRedpix;
         sLeft.pbGrnpix = sMiddle.pbGrnpix;
         sLeft.pbBlupix = sMiddle.pbBlupix;

/* Copy the Right line to the Middle line */
         sMiddle.pbRedpix = sRight.pbRedpix;
         sMiddle.pbGrnpix = sRight.pbGrnpix;
         sMiddle.pbBlupix = sRight.pbBlupix;

/* Copy the Left line to the Right line */
         sRight.pbRedpix = pbRedTemp;
         sRight.pbGrnpix = pbGrnTemp;
         sRight.pbBlupix = pbBluTemp;
```

```
            vCalcLineABC (&sLeft,&sMiddle,&sRight,&sAlpha,&sBeta,&sCappa);
        }
        fBoundary++;
        cbSrcCount++;
        X = fTincAccum - cbSrcCount;
    } for (cCount=0; cCount < cbSrcPix; cCount++)
    { sTarLine.plRedpix[cCount] = (long) (sAlpha.fRedpix[cCount]*X*X -
                                    sBeta.fRedpix[cCount]*X +
                                    sCappa.fRedpix[cCount]);

sTarLine.plGrnpix[cCount] = (long) (sAlpha.fGrnpix[cCount]*X*X -
                                    sBeta.fGrnpix[cCount]*X +
                                    sCappa.fGrnpix[cCount]);

sTarLine.plBlupix[cCount] = (long) (sAlpha.fBlupix[cCount]*X*X -
                                    sBeta.fBlupix[cCount]*X +
                                    sCappa.fBlupix[cCount]);

} vClampZoom (&sTarLine);
    vWriteRGB ( &sTarLine );

cbUpCount++;
    fTincAccum += fTinc;

vPercentComplete (cbUpCount,cbTarLine-1);
    } while (cbUpCount < cbTarLine);

vDeallocSrcLine( &sLeft   );
    vDeallocSrcLine( &sMiddle );
    vDeallocSrcLine( &sRight  );
    vDeallocTarLine( &sTarLine );

vDeallocFloatLine ( &sAlpha );
    vDeallocFloatLine ( &sBeta  );
    vDeallocFloatLine ( &sCappa );
} void vCalcLineABC(VIDEO_LINE   *psLeft,
                  VIDEO_LINE   *psMiddle,
                  VIDEO_LINE   *psRight,
                  FLOAT_LINE   *psAlpha,
                  FLOAT_LINE   *psBeta,
                  FLOAT_LINE   *psCappa){ int   cCount;  /* Generic pixel counter */

/* Alpha = P[-1] + P[1] - 2*P[0] */ for (cCount=0; cCount < cbSrcPix; cCount++)
    { psAlpha->fRedpix[cCount] = psLeft->pbRedpix[cCount] +
                    psRight->pbRedpix[cCount] -
                    2*psMiddle->pbRedpix[cCount];
```

```
psAlpha->fGrnpix[cCount] = psLeft->pbGrnpix[cCount] +
                psRight->pbGrnpix[cCount] -
                2*psMiddle->pbGrnpix[cCount];

psAlpha->fBlupix[cCount] = psLeft->pbBlupix[cCount] +
                psRight->pbBlupix[cCount] -
                2*psMiddle->pbBlupix[cCount];

/* Beta = (P[1] - P[-1])/2 */ psBeta->fRedpix[cCount] =  (psRight->pbRedpix[cCount] -
                psLeft->pbRedpix[cCount] )/2;

psBeta->fGrnpix[cCount] =  (psRight->pbGrnpix[cCount] -
                psLeft->pbGrnpix[cCount] )/2;

psBeta->fBlupix[cCount] =  (psRight->pbBlupix[cCount] -
                psLeft->pbBlupix[cCount] )/2;

/* Cappa = P[0] */ psCappa->fRedpix[cCount] = psMiddle->pbRedpix[cCount];
psCappa->fGrnpix[cCount] = psMiddle->pbGrnpix[cCount];
psCappa->fBlupix[cCount] = psMiddle->pbBlupix[cCount];

} void vAllocFloatLine (FLOAT_LINE *psLine){

/*...Allocate memory space for the red line buffer */
psLine->fRedpix = (float *) malloc(cbSrcPix*sizeof(float));
assert ( psLine->fRedpix != NULL);

/*...Allocate memory space for the red line buffer */
psLine->fGrnpix = (float *) malloc(cbSrcPix*sizeof(float));
assert ( psLine->fGrnpix != NULL);

/*...Allocate memory space for the red line buffer */
psLine->fBlupix = (float *) malloc(cbSrcPix*sizeof(float));
assert ( psLine->fBlupix != NULL);

void vDeallocFloatLine (FLOAT_LINE *psLine){
  free(psLine->fRedpix);
  free(psLine->fGrnpix);
  free(psLine->fBlupix);

void vAdvance (VIDEO_LINE   *sLeft,
               VIDEO_LINE   *sMiddle,
               VIDEO_LINE   *sRight){

BYTE *pbRedTemp;
BYTE *pbGrnTemp;
BYTE *pbBluTemp;

/* Make a temporary copy of the Left pointer */
pbRedTemp = sLeft->pbRedpix;
pbGrnTemp = sLeft->pbGrnpix;
```

```
sLeft->pbRedpix = sMiddle->pbRedpix;
sLeft->pbGrnpix = sMiddle->pbGrnpix;
sLeft->pbBlupix = sMiddle->pbBlupix;

/* Copy the Right line to the Middle line */
sMiddle->pbRedpix = sRight->pbRedpix;
sMiddle->pbGrnpix = sRight->pbGrnpix;
sMiddle->pbBlupix = sRight->pbBlupix;

/* Copy the temporary left pointers to right */
sRight->pbRedpix = pbRedTemp;
sRight->pbGrnpix = pbGrnTemp;
sRight->pbBlupix = pbBluTemp;

/* Load new line */
vReadRGB(sRight);
```

```
*-------------------------------------------------------------------------

Module :

vVertical Zoom Clamp

Description :

This routine clamps the line values of a horizontally expanded video
        line.

Inputs:

Target Line -- Contains all the unclamped lines.

Outputs:

Target Line -- All line values are between 0 and 255.

----  -------------------------------------------------------------------*/ void vClampZoom ( FRAC_LINE *psTarLine ){ int   cCount;  /* Source line line counter */

/* Loop for the entire number of target pixels */ for (cCount=0; cCount < cbTarPix; cCount++) {

/* Clamp pixel to 0 or 255 */
        if (psTarLine->plRedpix[cCount] > 255)
            psTarLine->plRedpix[cCount] = 255;
        if (psTarLine->plRedpix[cCount] < 0)
            psTarLine->plRedpix[cCount] = 0;

if (psTarLine->plGrnpix[cCount] > 255)
            psTarLine->plGrnpix[cCount] = 255;
        if (psTarLine->plGrnpix[cCount] < 0)
            psTarLine->plGrnpix[cCount] = 0;

if (psTarLine->plBlupix[cCount] > 255
```

```
        if (psTarLine->plBlupix[cCount] < 0)
            psTarLine->plBlupix[cCount] = 0;
}
```

I claim:

1. A quadratic interpolator generating an output signal sample y(x) for each of a plurality of reference values x and based on known signal samples y(−1), y(0), and y(1) spaced apart a predetermined equal amount, x being in a range of one-half of said predetermined equal amount on either side of respective one of said known signal samples, said quadratic interpolator comprising:

means for outputting a first signal having value a=y(−1)+y(1)−2y(0) and a second signal having value b=(y(1)−y(−1))/2; and means for inputting x, for determining $x^2$, for receiving the first signal and the second signal, for producing a third signal having value x times b, for producing a fourth signal having value $x^2$ times a, and for adding the third signal, the fourth signal and the y(0), and in response generating the output signal sample y(x).

2. The quadratic interpolator as claimed in claim 1, wherein said means for outputting comprises:

a first register storing known signal sample y(−1), a second register, coupled to the first register, storing known signal sample y(0), a third register, coupled to the second register, storing known signal sample y(1), a first adder, coupled to the first register and to the second register, adding the known signal sample y(−1) and the known signal sample y(1) together, and producing a first partial result signal, a first shifter, coupled to the second register, multiplying the known signal sample y(0) by 2, by shifting the known signal sample left, and outputting a shifted output, a first subtractor having an inverting input and a non-inverting input, said first subtractor coupled to the first adder and to the first shifter, receiving the first partial result signal at the non-inverting input and the shifted output at the inverting input, and outputting said first signal, a second subtractor having an inverting input and a non-inverting input, said second subtractor coupled to the first register and to the second register, receiving the known signal sample y(−1) at the inverting input and the known signal sample y(1) at the non-inverting input, and outputting a second partial result signal, and a second shifter, coupled to the second subtractor, receiving the second partial result signal and shifting the second partial result right, outputting said second signal; and wherein said means for inputting comprises:

a first multiplier receiving the x and multiplying the x by itself, producing $x^2$, and outputting a squared result signal, a second multiplier, coupled to the first multiplier and to the first subtractor, multiplying the squared result signal by the first signal, and outputting said fourth signal, a third multiplier, coupled to the second shifter, receiving the x, multiplying the x by the second signal, and outputting said third signal, and a second adder, coupled to the second multiplier, to the third multiplier, and to the second register, adding said fourth signal, said third signal, and the known signal sample y(0), and outputting the output signal sample y(x).

3. A method of a quadratic interpolator for generating a quadratic interpolated output signal sample y(x) for each of a plurality of reference values x and based on known signal samples y(−1), y(0), and y(1) spaced apart a predetermined equal amount, x being in a range of one-half of said predetermined equal amount on either side of respective one of said known signal samples, said method comprising the steps of:

a) generating by a first subtractor signal a=y(−1)+y(1)−2y(0) and by a second subtractor signal b=(y(1)−y(−1))/2; and b) generating by an adder output signal $y(x)=ax^2+bx$.

* * * * *